S. B. BOLTON.
Tire Tightener.

No. 103,550. Patented May 31, 1870.

Geo. W. Raff
A. Choffin } Witnesses.

Simeon B. Bolton Inventor.
by Job Abbott Attorney

N. PETERS, PHOTO-LITHOGRAPHER, WASHINGTON, D.C.

UNITED STATES PATENT OFFICE.

SIMEON R. BOLTON, OF PRESCOTT, WISCONSIN.

IMPROVEMENT IN TIGHTENING WHEEL-TIRES.

Specification forming part of Letters Patent No. 103,550, dated May 31, 1870.

*To all whom it may concern:*

Be it known that I, SIMEON R. BOLTON, of Prescott, Pierce county, Wisconsin, have invented certain Improvements in Devices for Tightening Wheel-Tires; and that the following is a full, clear, and exact specification of my invention.

Nature and Objects of the Invention.

My invention relates to the construction of a tapering or conical-shaped screw, provided with one or two arms extending radially from its head, which is used in combination with two face-blocks, secured by dowel-pins in a space in the felly of the wheel, said screw, when turned forward, acting to force the face-blocks apart, thus increasing the circumference of the felly and causing it to fit tightly within the tire, and the said screw-arms serving as means by which the screw can be secured in any required position after being screwed down to its place, so that the danger of the screw working loose and dropping out, and thus allowing the tire to come off, is fully obviated.

Description of Accompanying Drawing.

Figure 1:
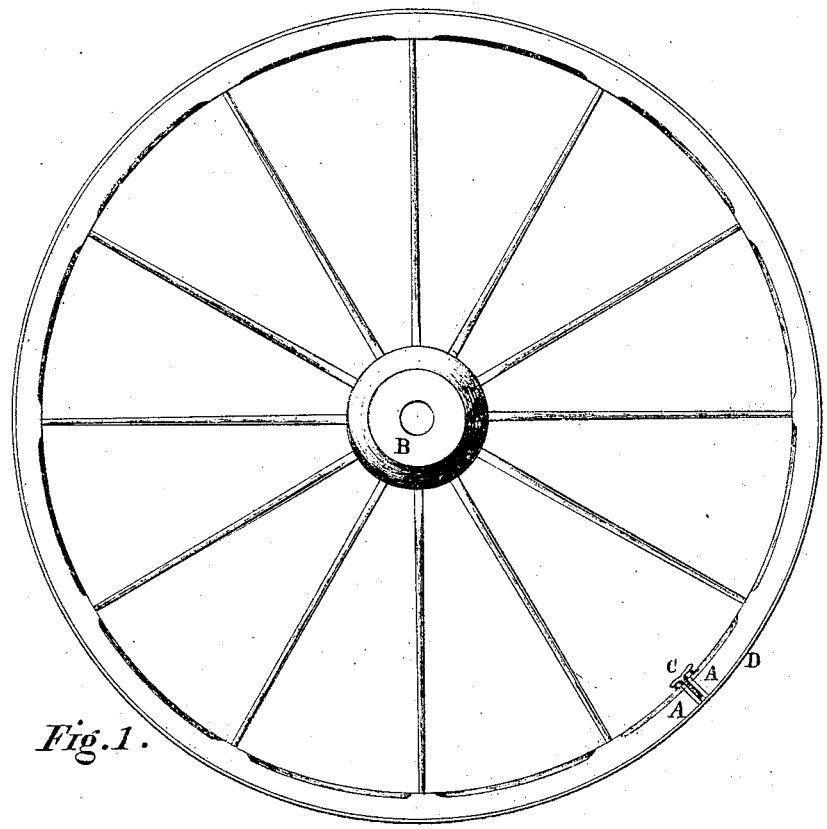
Figure 2:
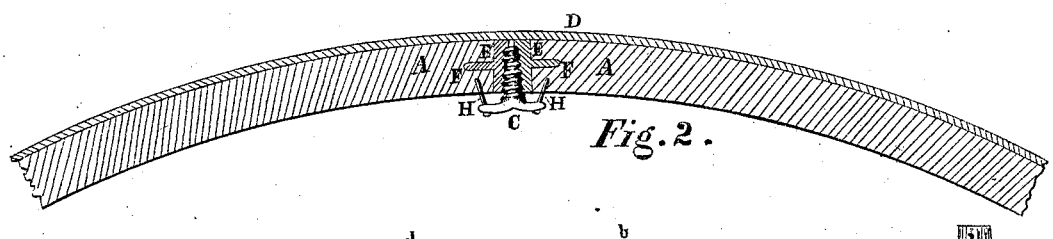
Figure 3:
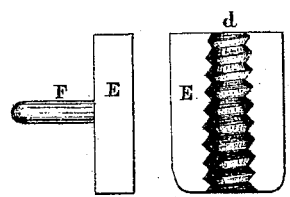
Figure 4:

Figure 1 is an elevation of a wheel embodying my improvement. Fig. 2 is an enlarged sectional detail of a portion of the felly. Figs. 3 are side and face views of one of the felly-blocks. Figs. 4 are side view and plan of the tighening-screw.

General Description.

The wheel B is of an ordinary form, and is constructed with the wooden felly A A, which is surrounded by the iron tire D. A space is left between the ends A A of the felly, and on the faces of these ends are secured the felly-blocks E E by means of the dowel-pins F F, which are cast or otherwise secured on the backs of the blocks E E, and fit in holes in the ends of the felly A A, as shown in Fig. 2.

The screw-seats *d e* are formed in the adjacent faces of the felly-blocks E E, as shown in Figs. 3, and between these blocks and in said seats is arranged the tightening-screw C, as shown in Fig. 2. This tightening-screw is made with a tapering body, *a b*, the head *a* being the larger end of said body, and on this head *a* are secured the arms K K, which extend radially from said head, and have the holes *f f* formed in them, as shown in plan in Figs. 4.

From this description it is seen that by turning down the screw C the felly-blocks E E will be forced apart, thus causing the circumference of the felly A A to lengthen, and making the felly to fit more tightly within the tire D; and it is also seen that when the screw C is turned down into the required position it can be there secured by the pins or screws H H, which are driven through the holes *f* in the arms K into the felly A A.

I am aware that tapering wedges provided with arms at their heads, and of the general form shown in right-hand figure in Figs. 4, have been used in connection with felly-blocks for expanding the felly; but these wedges were not screw-wedges, and were forced down by means of a downward force applied to bolts or screws through the arms of the wedge, and not by the rotation of the wedge itself.

I am also aware that tapering screws have been used in connection with the felly-blocks for expanding the felly; but said screws had no arms or other means of securing them from turning and working loose and dropping out, thus allowing the tire to drop off, which was a serious objection to their use; and the manner of securing the felly-blocks in the felly in previous combinations of a tapering screw with a felly-block were much less simple and more expensive, without being any more effective, than that herein described.

Claim.

What I claim as my invention, and desire to secure by Letters Patent, is—

One or two arms, K K, with holes *f f*, on the tapering screw C, arranged between the felly-blocks E E, said arms, in combination with the pin H, serving to secure said tapering screw in position, substantially as is herein specified.

SIMEON R. BOLTON.

Witnesses:
 PARKER ADAMS,
 L. R. SMITH.